Feb. 28, 1933.  J. H. EDWARDS  1,899,799
WELDED BRACKET CONNECTION
Filed June 5, 1928
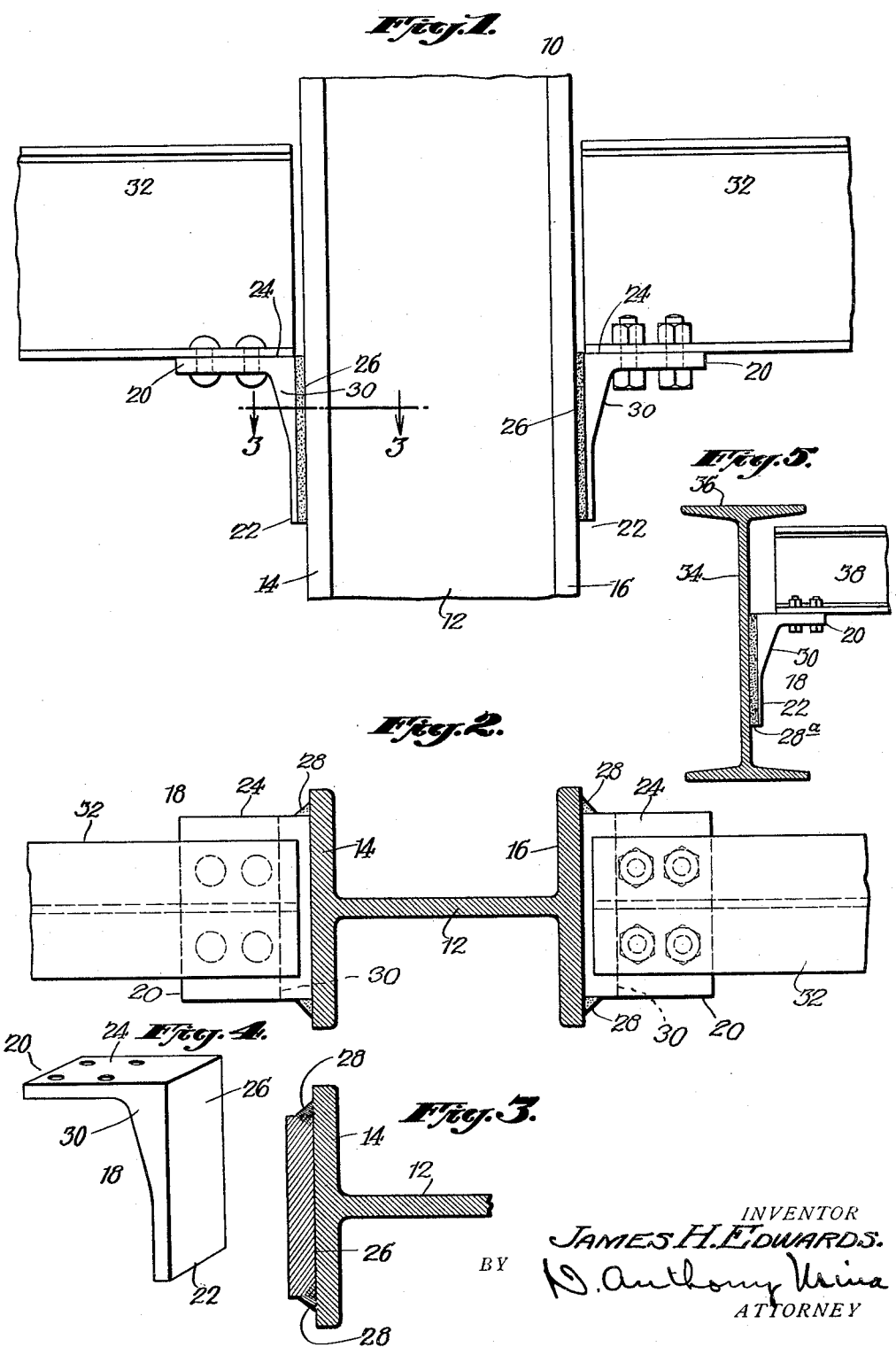
INVENTOR
JAMES H. EDWARDS.
BY
D. Anthony Urina
ATTORNEY Patented Feb. 28, 1933

1,899,799

UNITED STATES PATENT OFFICE

JAMES H. EDWARDS, OF PASSAIC, NEW JERSEY

WELDED BRACKET CONNECTION

Application filed June 5, 1928. Serial No. 283,017.

This invention relates to steel construction and aims to provide an improved bracket connection adapted to form a seat for beams, girders, joists or the like. The invention will be fully apparent from the following specification when read in connection with the accompanying drawing and will be defined with particularity in the appended claims.

In the drawing—
Fig. 1 is an elevation of a column having connection members secured thereto embodying my invention;

Fig. 2 is a top plan of Fig. 1;

Fig. 3 is a horizontal section on line 3—3 of Fig. 1;

Fig. 4 is a perspective view of a connection embodying my invention;

Fig. 5 is a view showing my improved connection applied to a beam or girder.
Referring in detail to the drawing, 10 represents a column which in the case illustrated is in the form of a solid rolled H-section having a central web 12 and outer flanges 14 and 16.
For framing beams, girders or similar members to the column, I provide a novel form of connection which in the embodiment illustrated comprises an angle bracket indicated as a whole by numeral 18 consisting of legs 20 and 22 having bearing faces 24 and 26 which are disposed at right angles to one another. The leg 22 is preferably permanently and integrally connected to the column 10 by means of fused metal joints 28.
These joints may be made either by electric welding, gas welding or by any other known method of making an intimate homogeneous bond between the bracket 18 and any portion of the column.
As clearly shown in the drawing, the leg 20 is of substantially uniform cross-section throughout its length while the leg 22 gradually increases in cross-section from a point near the outer end of the leg to that point at which it joins the leg 20. In other words, the bracket is so shaped in cross-section that a relatively thick fillet portion 30 is provided. This permits the provision of a connection which is better able to resist forces transmitted by the beams or girders 32 which are secured to the legs 20 of the bracket.

Heretofore, it has been the practice in making beam and column connections to use angle brackets formed from stock size roller shaped. With such brackets there is a tendency for the connections to bend at the fillet between the horizontal and vertical legs.

It is impractical to reinforce the old types of brackets because of the practice in general vogue of securing the prior connections to the column or support by means of rivets. In my improved connection, the reinforced bracket can be used because the same is welded directly to the column and does not present the problems which would be encountered if such a reinforced plate were to be riveted to the column. It is impractical to rivet a bracket with a tapered leg like that shown because of the fact that rivet holes cannot be practically formed with such a tapered or thickened body. The usual and economical method of forming rivet holes is to punch them. It is too costly in building construction to drill such holes but even if drilling were practical, it would be an awkward operation to drill against the inclined surface and if the drilling were done from the back of the bracket so as to start against the perpendicular surface, a special jig would be necessary for supporting the same. By the utilization of a welded joint for securing the strength of bracket to the column or other support, I overcome the difficulties enumerated and I am enabled to secure a much stronger connection than that secured by any other prior form of riveted or bolted connection.

The girders or beams may be secured to the legs 20 of the supporting brackets either by means of rivets as shown at the left of Fig. 1 or by bolts as shown at the right of the same figure. Where bolts are used, it is proposed to eventually form a welded or other fused metal joint between the beam and the supporting bracket.

In Fig. 5, I have shown my improved bracket 18 welded at 28ª to the web 34 of a girder 36 and forming a seat for the floor beam 38 which is secured to the leg 20 by bolts as shown.

The brackets are preferably formed of rolled steel shapes cut into short lengths of sufficient size to fit the condition for which they are to be used and may be made in different sizes to suit different loading conditions. The relative thickness of the fillet portion 30 may be varied in accordance with loading requirements, but in any case, the bracket will be of such strength that it will offer a greater resistance to bending or other force transmitted thereto by the beams and girders than that offered by the typical forms of angle brackets heretofore used.

The bracket shown and described is peculiarly well suited for making connections to columns, beams or girders and is designed to be secured to such structural members or other supports by a welded or fused metal joint as distinguished from riveted or bolted joints heretofore used. As above mentioned, the bracket with a thickened fillet portion can be practically used when secured in place by welding while the difficulties encountered make it undesirable from a practical standpoint to secure such a bracket by rivets or bolts.

While I have shown the bracket in connection with column and girder beam supports, it is to be understood that it can be used in other ways than that described and the terms "column" and "beam" used herein are to be construed in an illustrative rather than a limiting sense.

Various modifications may be made without departing from the invention as defined in the appended claims.

What I claim is:

1. A rolled section having a bracket secured thereto adapted to form a seat for a beam or girder, said bracket having legs at an angle to each other, one of said legs being substantially rectangular in cross section, and the other leg having a portion of substantially rectangular cross section which merges into a thickened wedge-shaped fillet portion, and fused metal joints uniting the bracket to said rolled section continuously along the edges of said fillet portion.

2. A rolled section having a bracket secured thereto adapted to form a seat for a beam or girder, said bracket having legs at an angle to each other, one of said legs being substantially rectangular in cross section and the other leg having a fillet portion substantially wedge-shaped in cross section and fused metal joints uniting the bracket with said rolled section, said joints extending continuously from the plane of the first named leg to the extremity of the second named leg.

3. A rolled section having a connection bracket secured thereto comprising two legs disposed substantially at right angles to one another, said legs being united by a thickened substantially triangular or wedge-shaped fillet portion and fused metal joints coextensive with the edges of said fillet portion and integrally and homogeneously uniting the bracket to said rolled section.

In witness whereof, I have hereunto signed my name.

JAMES H. EDWARDS.